United States Patent [19]
Doxey et al.

[11] Patent Number: 6,039,341
[45] Date of Patent: Mar. 21, 2000

[54] AIR BAG MODULE ASSEMBLY

[75] Inventors: Mark Harvey Doxey, Troy; Shirley M. Young, Mechanicsburg, both of Ohio

[73] Assignee: General Motors Corporation, Detroit, Mich.

[21] Appl. No.: 09/233,864

[22] Filed: Dec. 17, 1998

[51] Int. Cl.[7] .................................................. B60R 21/16
[52] U.S. Cl. ..................................... 280/728.2; 280/743.1
[58] Field of Search .............................. 280/728.1, 728.2, 280/728.3, 743.1, 730.2

[56] References Cited

U.S. PATENT DOCUMENTS

| | | | |
|---|---|---|---|
| 5,553,887 | 9/1996 | Karlow et al. | 280/730.2 |
| 5,568,936 | 10/1996 | Spilker et al. | 280/728.2 |
| 5,853,191 | 12/1998 | Lachat | 280/730.2 |
| 5,899,485 | 5/1999 | Folsom et al. | 280/728.2 |

*Primary Examiner*—Lanna Mai
*Assistant Examiner*—Kevin McKinley
*Attorney, Agent, or Firm*—Kathryn A. Marra

[57] ABSTRACT

An air bag module comprises an air bag, an air bag mounting bracket and a unitary flexible plastic housing having a front, opposed sides, a top, a bottom, a rear opening, and an integral door connected to each opposed side by a flexible hinge. The doors are sized to overlap and close the opening when folded closed. The mounting bracket includes a pair of spaced T-shaped tabs, and vehicle attachment portions extending from each end. A pair of upper and lower spaced slots are formed in each door and are slightly offset from alignment with each other and with one of the tabs when folded. The housing top and bottom adjacent the rear opening is relieved to create an opening to accommodate the vehicle attachment portions when the doors are closed. The housing may be deformed by manually squeezing the sides to align the slots to enable the tab head to protrude through the aligned slots. When the housing is manually released, the slots misalign to grip the tab stem beneath the enlarged head to secure the doors closed. In an alternate embodiment, only one of the doors has slots and the other door is vertically shortened to fit between the slots when the doors are folded closed. Since the shortened door is folded closed first, this shortening expands the upper and lower openings for the mounting bracket vehicle attachment portions.

10 Claims, 5 Drawing Sheets

AIR BAG MODULE ASSEMBLY

TECHNICAL FIELD

This invention relates to air bag modules and, more particularly, to an air bag module having a novel air bag housing and retention arrangement.

BACKGROUND OF THE INVENTION

Vehicle air bags are contained in an assembly which includes the air bag, a housing and an inflator. The assembly is then placed in a receptacle in the vehicle instrument panel or in the hub of the steering wheel for a frontal air bag, or in the seat or door panel for a side air bag.

One method of assembling the air bag assembly is to provide a housing having a rear opening. The air bag is folded and operatively attached to an inflator which is mounted on a support bracket. This subassembly is inserted through the opening into the housing, which is then closed with a panel that is heat-staked, ultrasonic-welded or riveted into place. The assembly is then ready for installation in a vehicle.

It is desirable to provide an air bag assembly that includes fewer parts and is much simpler to assemble.

SUMMARY OF THE INVENTION

It is an object of this invention to provide an air bag assembly that includes fewer parts and is much simpler to assemble.

In one aspect this invention features an air bag module comprising an air bag, an air bag mounting bracket and a flexible plastic housing. The housing has a front, opposed sides, a top, a bottom, a rear opening, and a door connected to each opposed side by a flexible hinge and sized such that when folded over the rear opening they will overlap and close the opening. A mounting bracket mounts an air bag on one side and includes a tab having an enlarged head supported by a narrow stem extending from the other side. A slot is formed in each door such that, when the doors are folded over to close the opening, the slots are slightly offset from alignment with each other and with the tab. When the air bag and mounting bracket are inserted within the housing and the doors are closed, the housing may be deformed by manually squeezing to align the slots on both doors. This enables the tab enlarged head to protrude through the aligned slots so that, when the housing is manually released, the slots will misalign to cause the slot peripheries to grip the tab stem beneath the enlarged head. This secures the doors closed and secures the mounting bracket and air bag within the housing.

In another aspect, the mounting bracket includes vehicle attachment portions which extend outside the housing at top and bottom. The housing top and bottom adjacent the rear opening is relieved sufficiently to permit the vehicle attachment portions to extend outside the housing when the doors are closed.

Preferably, the mounting bracket includes a second tab having enlarged head supported by a narrow stem extending from the other side, a second slot is formed in each door such that when the doors close the opening, the second slots are offset from each other and from the second tab. When the housing is deformed by manually squeezing the sides, the second slots on both doors are aligned to enable the second tab enlarged head to protrude through the slots so that, when the housing is manually released, the second slots will misalign to cause the second slot peripheries to grip the second tab stem beneath the enlarged head to further secure the doors closed and further secure the mounting bracket and air bag within the housing.

In a further aspect, only one door has spaced slots, while the other door extends the width of the opening, but is vertically shortened to extend between the slots of the one door when the doors are folded together.

These and further objects and features of this invention will become more readily apparent upon reference to the following detailed description of this invention, as illustrated in the attached drawings, in which:

DESCRIPTION OF THE PREFERRED EMBODIMENT

Figure 1:
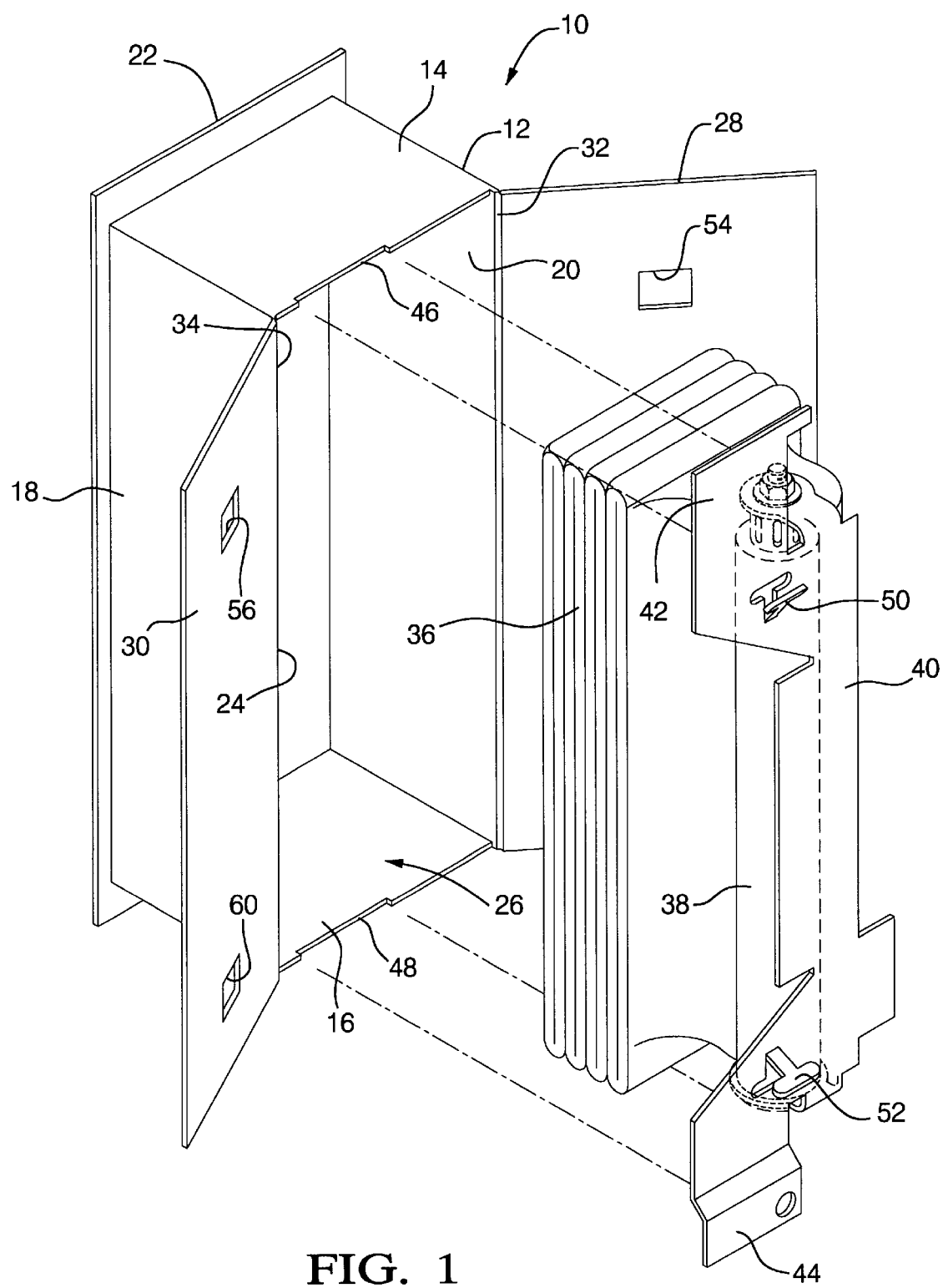
FIG. 1 is an exploded perspective view of an air bag module according to this invention.
Figure 2:
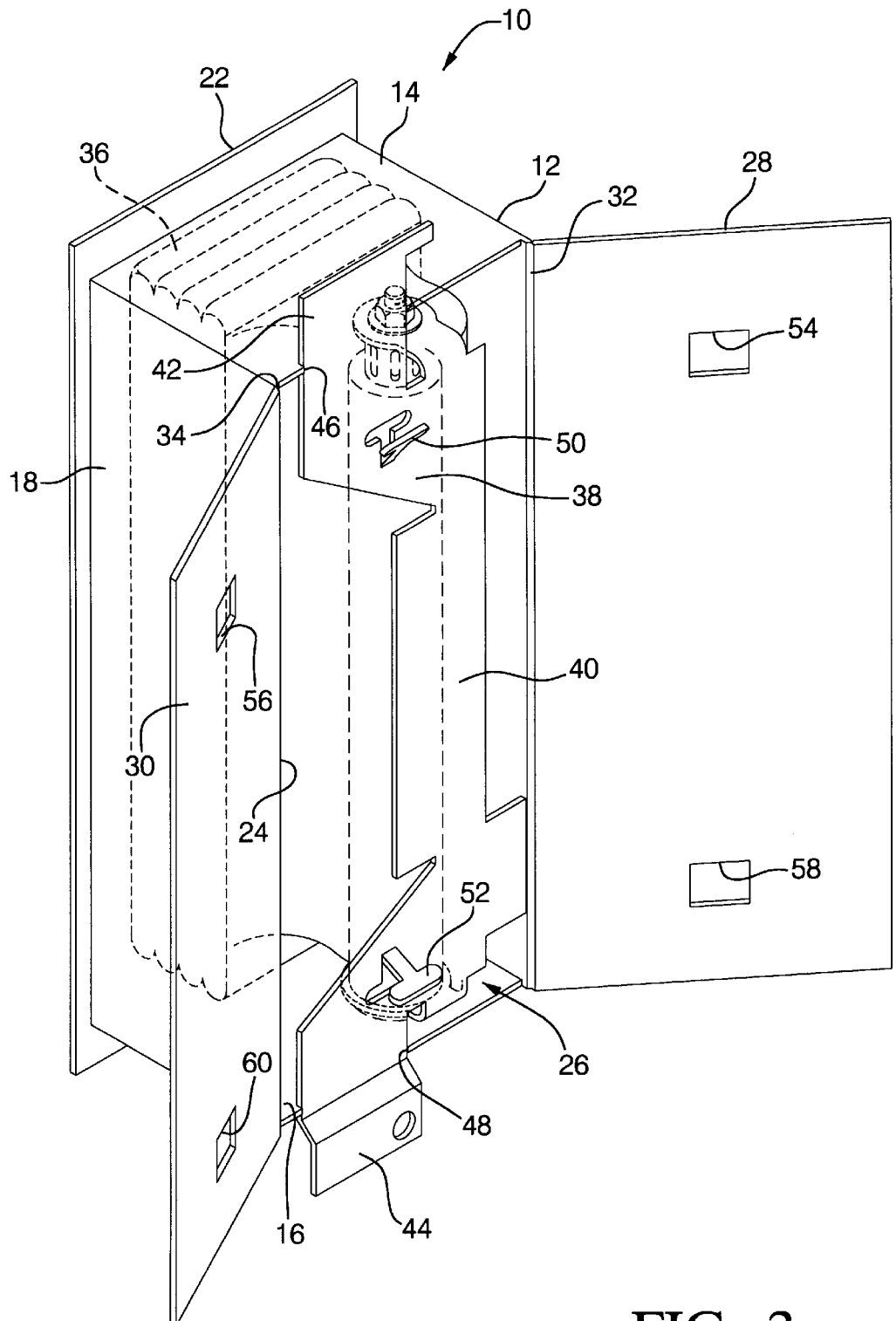
FIG. 2 is a perspective view of the air bag module illustrated in FIG. 1, shown partially assembled with the doors open.
Figure 3:
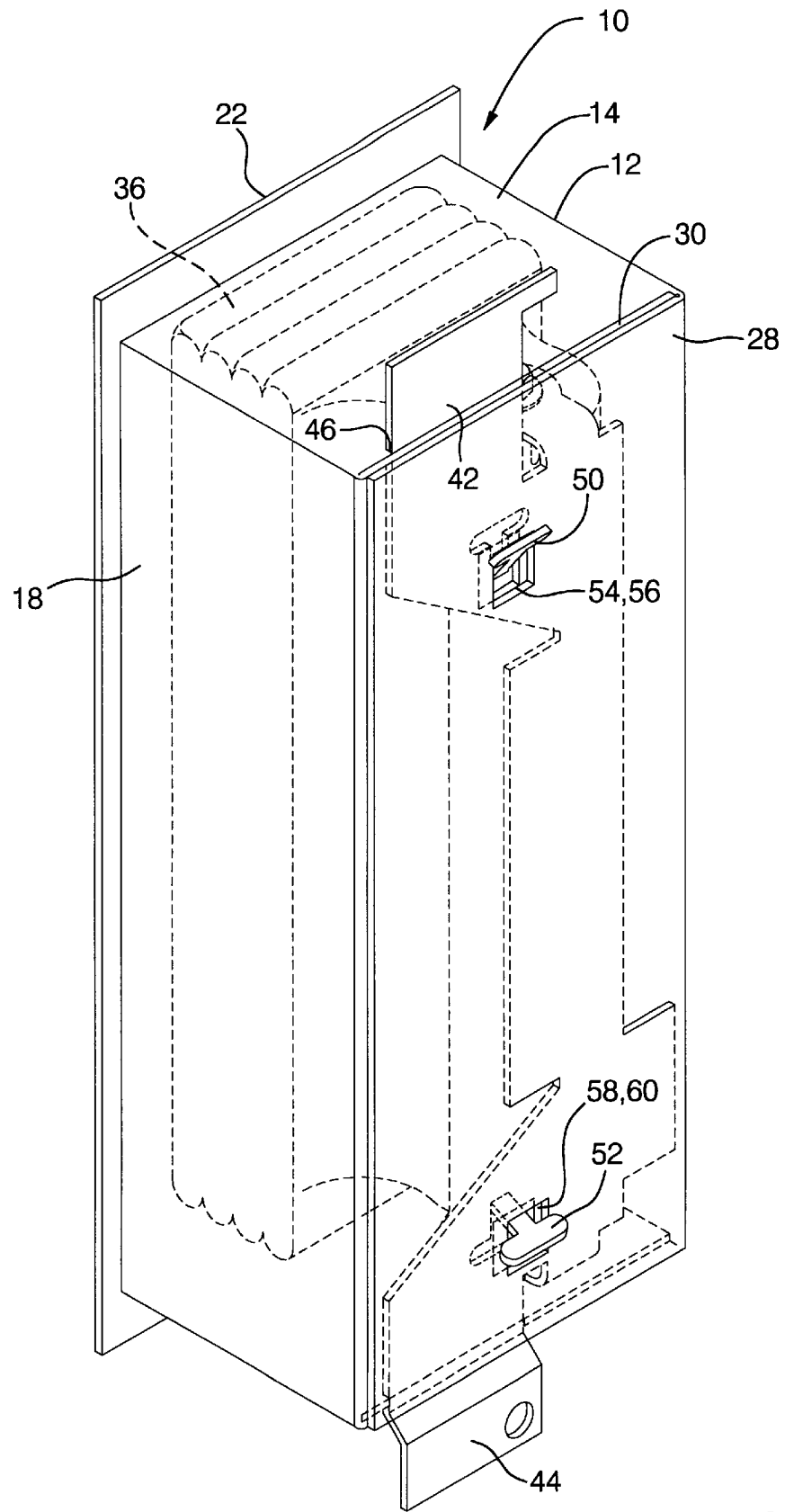
FIG. 3 is a perspective view of the air bag module illustrated in FIGS. 1 and 2, shown fully assembled with the doors closed.

FIGS. 1–3 show an air bag module 10 which comprises a metal housing 12 formed of a unitary piece of flexible plastic. Housing 12 includes a top 14, a bottom 16, opposed sides 18 and 20, a front cover 22 and a rear opening 24 which define a cavity 26. Rear opening 24 is closable by doors 28 and 30 that are integrally connected to sides 20 and 18 respectively by hinge sections 32 and 34.

An air bag 36 is folded and operatively attached to an inflator 38 which is mounted on a mounting bracket 40. Vehicle attachment portions 42 and 44 extend from the upper and lower ends of mounting bracket 40. As shown in FIG. 2, when the mounting bracket 40 is inserted through opening 24 into the cavity 26 of housing 12 with air bag 36 and inflator 38, these vehicle attachment portions 42 and 44 extend above housing top 14 and below housing bottom 16. To enable doors 28 and 30 to fully close rear opening 24, as shown in FIG. 3, housing top 14 and bottom 16 are relieved by including cutouts 46 and 48 to accommodate vehicle attachment portions 42 and 44.

Mounting bracket 40 also includes a pair of spaced, T-shaped tabs 50 and 52. Doors 28 and 30 include upper slots 54, 56 and spaced lower slots 58, 60. Slot pairs 54, 56 and 58, 60 are slightly offset from full alignment when the doors are closed so as to provide an aligned slot only as wide as the stem of tabs 50 and 52. Tabs 50 and 52 are spaced the same distance as are slots 54, 58 and 56, 60 so that when mounting bracket 40 is inserted into housing cavity 26, as in FIG. 2, tabs 52 and 50 align with respective slot pairs 54, 56 and 58, 60 as doors 28 and 30 are closed. However, doors 28 and 30 cannot be fully closed, because the head of tabs 50 and 52 cannot project through slots 54, 58.

At this point of assembly, housing sides 18 and 20 are squeezed together to slide doors 28 and 30 relative to each other sufficiently to align slot pairs 54, 56 and 58, 60 (phantom lines in FIG. 3), which enables the heads of tabs 50 and 52 to project through the aligned slot pairs as doors 28 and 30 are fully closed. Sides 18 and 20 are released to allow doors 28 and 30 to slide back to their relaxed position, with slot pairs 54, 56 and 58, 60 again slightly misaligning so that their sides grip the stems of tabs 50 and 52. This traps the doors beneath the heads of tabs 50 and 52 to secure the doors closed and the mounting bracket 40, air bag 36 and inflator 38 within housing cavity 26.

No rivets, welds or any type of fasteners are used. Assembly is simplified and assembly time is reduced markedly. Assembly now comprises the simple steps of insert mounting bracket, partially close doors, squeeze housing sides while fully closing doors, and release housing sides.

Figure 4:
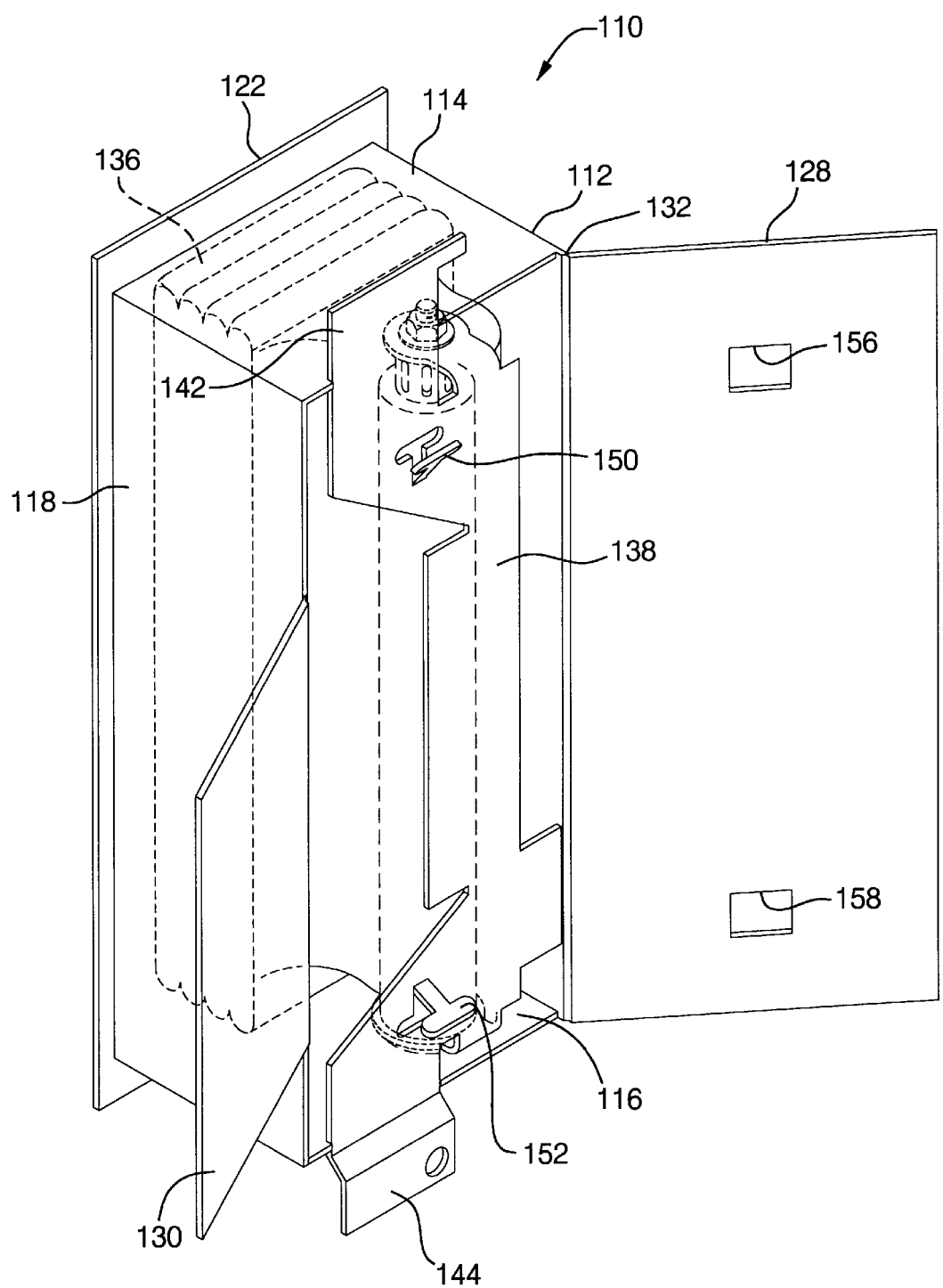
FIG. 4 is a perspective view similar to FIG. 2, but illustrating another embodiment of air bag module according to this invention.
Figure 5:
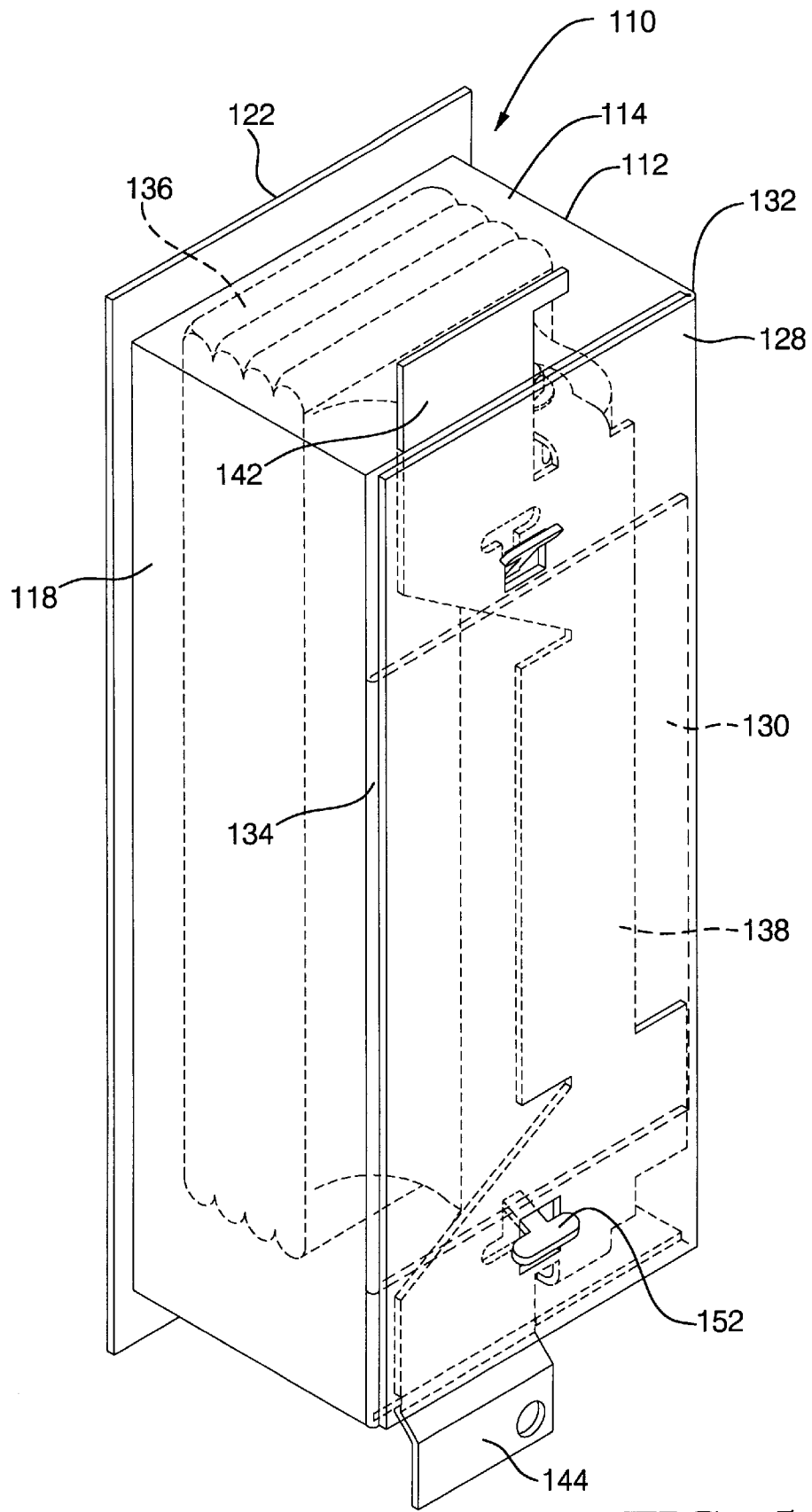
FIG. 5 is a perspective view of the air bag module of FIG. 4, shown fully assembled with the doors closed.

Another embodiment of this invention is shown in FIGS. 4 and 5, where elements bear the same reference numerals as like elements in the FIGS. 1–3 embodiments, but increased by 100. Here, housing 112 differs from housing 12 by including a modified form of one of the doors 130, which is foreshortened so that it extends between slots 154 and 158 of opposite door 128. In this embodiment, slots 154 and 158 are slightly offset from alignment with tabs 150 and 152. Assembly is as before, except that door 130 is closed first, followed by door 128. Housing sides 118 and 120 are squeezed to allow the heads of tabs 150 and 152 to pass through slots 154 and 158. Relaxing sides 118 and 120 will cause one side of slots 154 and 158 to grip the side of the stems of tabs 150 and 152, trapping door 128 beneath the heads of the tabs. This embodiment provides a larger space at top and bottom to accommodate more extensive upper and lower vehicle attachment portions or other projections of the mounting bracket which extend beyond the housing.

While only a preferred and alternative embodiment of this invention have been shown and described, modifications thereof are contemplated within the scope of the following claims.

We claim:

1. An air bag module comprising an air bag, an air bag mounting bracket and a housing, characterized by the housing having a front, opposed sides, a top, a bottom, a rear opening, and a door connected to each opposed side by a flexible hinge and sized such that when folded over the rear opening they will overlap and close the opening, a mounting bracket mounting an air bag on one side and including a tab having an enlarged head supported by a narrow stem extending from the other side, a slot formed in each door such that, when the doors are folded over to close the opening, the slots are slightly offset from alignment with each other and with the tab, the housing being formed of flexible plastic such that when the air bag and mounting bracket are inserted within the housing and the doors closed, the housing may be deformed by manually squeezing to align the slots on both doors to enable the tab enlarged head to protrude through the aligned slots so that, when the housing is manually released, the slots will misalign to cause the slot peripheries to grip the tab stem beneath the enlarged head to secure the doors closed and secure the mounting bracket and air bag within the housing.

2. The air bag module of claim 1, further characterized by the mounting bracket including a second tab spaced from the first tab and having an enlarged head supported by a narrow stem extending from the other side, a second slot formed in each door such that when the doors close the opening, the second slots are offset from alignment with each other and with the second tab, whereby when the housing is deformed by said manually squeezing the sides, the second slots on both doors are aligned to enable the second tab enlarged head to protrude through the aligned slots so that, when the housing is manually released, the second slots will misalign to cause the second slot peripheries to grip the second tab stem beneath the enlarged head to further secure the doors closed and further secure the mounting bracket and air bag within the housing.

3. The air bag module of claim 2, further characterized by the tabs being T-shaped.

4. The air bag module of claim 1, further characterized by the mounting bracket including a vehicle attachment portion which extends outside the housing, and the housing top adjacent the rear opening is relieved sufficiently to permit the vehicle attachment portion to extend outside the housing when the doors are closed.

5. The air bag module of claim 1, further characterized by the housing being a unitary piece of plastic having the doors formed integrally therewith.

6. The air bag module of claim 1, further characterized by the mounting bracket including a second vehicle attachment portion which extends outside the housing, and the housing bottom adjacent the rear opening is relieved sufficiently to permit the second vehicle attachment portion to extend outside the housing when the doors are closed.

7. The air bag module of claim 1, further characterized by both doors extending the full width of the opening.

8. An air bag module comprising an air bag, an air bag mounting bracket and a housing, characterized by the housing having a front, opposed sides, a top, a bottom, a rear opening, and a door connected to each opposed side by a flexible hinge and sized such that when folded over the rear opening they will overlap and close the opening, a mounting bracket mounting an air bag on one side and including a tab having an enlarged head supported by a narrow stem extending from the other side, a slot formed in one of the doors such that, when the doors are folded over to close the opening, the slot is offset from alignment with the tab enlarged head, the housing being formed of flexible plastic such that when the air bag and mounting bracket are inserted within the housing and the doors closed by first folding the other door closed and then folding the one door closed, the housing may be deformed by manually squeezing the sides to align the slot with the tab enlarged head to enable the tab enlarged head to protrude through the slot so that, when the housing sides are manually released, the slot will offset from alignment with the tab enlarged head to cause the slot periphery to grip the tab stem beneath the enlarged head to secure the doors closed and secure the mounting bracket and air bag within the housing.

9. The air bag module of claim 8, further characterized by the mounting bracket including a second tab having an enlarged head supported by a narrow stem extending from the other side, the one door having another slot spaced from the first slot, such that, when the doors are folded over to close the opening, the second slot is offset from alignment with the second tab enlarged head, whereby when the housing is deformed by said manually squeezing the sides, the second slot is aligned with the second tab enlarged head to enable the second tab enlarged head to protrude through the aligned slot so that, when the housing sides are manually released, the second slot will misalign to cause the second slot periphery to grip the second tab stem beneath the enlarged head to further secure the doors closed and further secure the mounting bracket and air bag within the housing.

10. The air bag module of claim 9, further characterized by the other door extending laterally across the width of the opening vertically between the slots in the one door.

* * * * *